(12) United States Patent
Quijano

(10) Patent No.: US 7,265,988 B2
(45) Date of Patent: Sep. 4, 2007

(54) CIRCUIT BOARD MODULE INCLUDING AN INTEGRAL CONNECTOR PANEL

(75) Inventor: David Quijano, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 10/805,908

(22) Filed: Mar. 22, 2004

(65) Prior Publication Data

US 2005/0207128 A1    Sep. 22, 2005

(51) Int. Cl.
*H05K 7/00*    (2006.01)

(52) U.S. Cl. ............... 361/728; 361/684; 361/679; 361/796

(58) Field of Classification Search ............... 361/752, 361/797, 800, 816, 724, 796, 684, 730, 788, 361/801–802, 790; 455/347; 348/836; 257/99; 174/51
See application file for complete search history.

(56) References Cited

U.S. PATENT DOCUMENTS

| | | | |
|---|---|---|---|
| 5,519,573 A * | 5/1996 | Cobb et al. ............... 361/686 |
| 5,555,158 A * | 9/1996 | Dent ............... 361/684 |
| 5,596,483 A * | 1/1997 | Wyler ............... 361/683 |
| 5,650,911 A * | 7/1997 | Scholder et al. ............... 361/684 |
| 5,822,182 A * | 10/1998 | Scholder et al. ............... 361/683 |
| 5,839,584 A * | 11/1998 | Gonsalves et al. ............... 211/41.17 |
| 5,973,926 A * | 10/1999 | Sacherman et al. ............... 361/759 |
| 6,000,767 A * | 12/1999 | Liu et al. ............... 312/223.2 |
| 6,058,025 A * | 5/2000 | Ecker et al. ............... 361/816 |
| 6,205,020 B1 * | 3/2001 | Felcman et al. ............... 361/683 |
| 6,247,078 B1 * | 6/2001 | Ebert et al. ............... 710/301 |
| 6,550,877 B1 * | 4/2003 | Anderson et al. ............... 312/223.2 |
| 6,934,162 B2 * | 8/2005 | Perez et al. ............... 361/759 |
| 7,016,197 B2 * | 3/2006 | Kirner ............... 361/752 |

\* cited by examiner

*Primary Examiner*—Dean A. Reichard
*Assistant Examiner*—Hung S Bui

(57) ABSTRACT

In one embodiment, a circuit board module comprises a circuit board that includes a processor and memory, and a connector panel that provides access to connectors that are connected to the circuit board, wherein the connector panel and the circuit board are connected together so as to form a single, integrated unit that can be installed in a computer.

17 Claims, 6 Drawing Sheets

CIRCUIT BOARD MODULE INCLUDING AN INTEGRAL CONNECTOR PANEL

BACKGROUND

Computers, such as personal computers (PCs), workstations, and terminal computers, typically comprise a chassis that supports one or more main circuit boards or "motherboards." Often, a motherboard extends to a connector panel or back plane of the chassis so that connectors coupled with (e.g., mounted to) the motherboard can be accessed by a user from the computer exterior.

Motherboards are normally mounted within computers by orienting the motherboard at an angle relative to the chassis back plane and inserting the motherboard into an interior space formed by the chassis such that any connectors mounted to the motherboard align with and/or extend through openings provided in the back plane. Once the motherboard is seated in place, the motherboard is secured to the chassis thereto, for instance with several screws.

Although the aforementioned manufacturing scheme is at least marginally effective, it creates disadvantages in some respects. For instance, due to the manner in which the motherboard is inserted into the computer chassis, the chassis often must have a predefined minimum width so as to provide enough clearance for the motherboard to be interfaced with the computer back plane and then seated into a position. As a result, the width of the computer is increased.

Another disadvantage relates to the configuration of the back plane when different motherboard variants are to be used. Specifically, when different motherboards having different connector configurations are to be used in the same computer "box" (e.g., when different computer versions are to be offered for sale), a different chassis normally must be manufactured for each motherboard version given that the back plane forms an integral part of the chassis. This is undesirable given that greater cost savings could be achieved if a single chassis could accommodate all motherboard versions and connector configurations.

SUMMARY OF THE DISCLOSURE

In one embodiment, a circuit board module comprises a circuit board that includes a processor and memory, and a connector panel that provides access to connectors that are connected to the circuit board, wherein the connector panel and the circuit board are connected together so as to form a single, integrated unit that can be installed in a computer.

In one embodiment, a method for manufacturing a computer includes pre-assembling a motherboard module comprising a motherboard and an integral connector panel, and installing the motherboard module as a single unit in a computer chassis.

BRIEF DESCRIPTION OF THE DRAWINGS

The disclosed apparatus and methods can be better understood with reference to the following drawings. The components in the drawings are not necessarily to scale.

DETAILED DESCRIPTION

Disclosed herein are embodiments of a circuit board module that can be installed within a computer. In some embodiments, the circuit board module comprises a motherboard and an integral connector panel. As is described in the following, creation of such an integrated module increases ease of manufacturing and servicing of computers and enables a decrease of the size of those computers.

Figure 1:
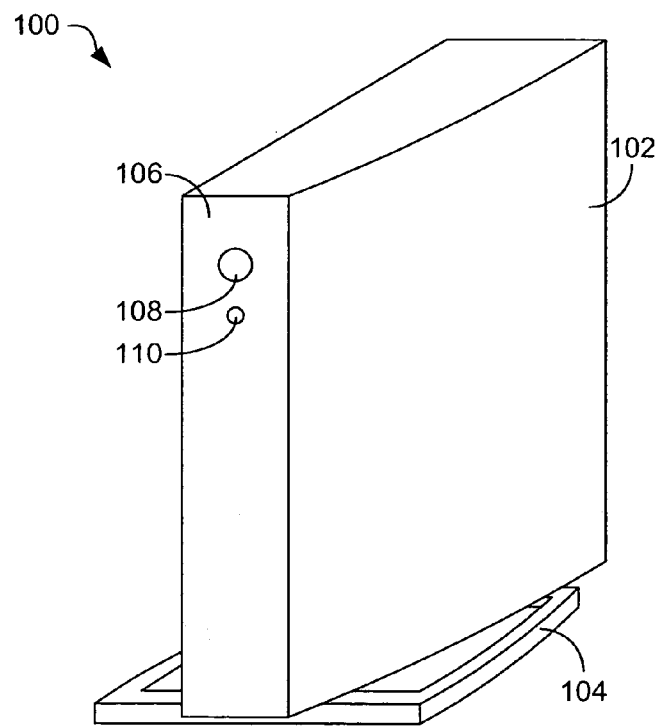
FIG. 1 is a front perspective view of an embodiment of a computer that comprises a motherboard module that includes an integral connector panel.

Referring now to the drawings, in which like numerals indicate corresponding parts throughout the several views, FIG. 1 illustrates a computer 100. By way of example, the computer 100 comprises a terminal computer of the type that includes no mass storage devices such as a hard drive or a compact disc (CD) drive. In such a case, the computer 100 is used as a mechanism or means for accessing other computers, such as local or remote servers. Although a terminal computer has been specifically identified as a possible embodiment, the computer 100 can comprise any other computer that includes a motherboard and a connector panel. Other examples include a personal computer (PC), a workstation, a server computer, and the like.

As shown in FIG. 1, the computer 100 includes an outer housing 102 that encloses an inner chassis (not visible in FIG. 1) of the computer. In the example embodiment, the computer 100 is mounted on a support member 104 that provides stability to the computer so that it can be placed in an upright position illustrated in FIG. 1. On a front panel 106 of the computer 100 is a power button 108 and a power indicator 110, such as a light-emitting diode (LED).

Figure 2:
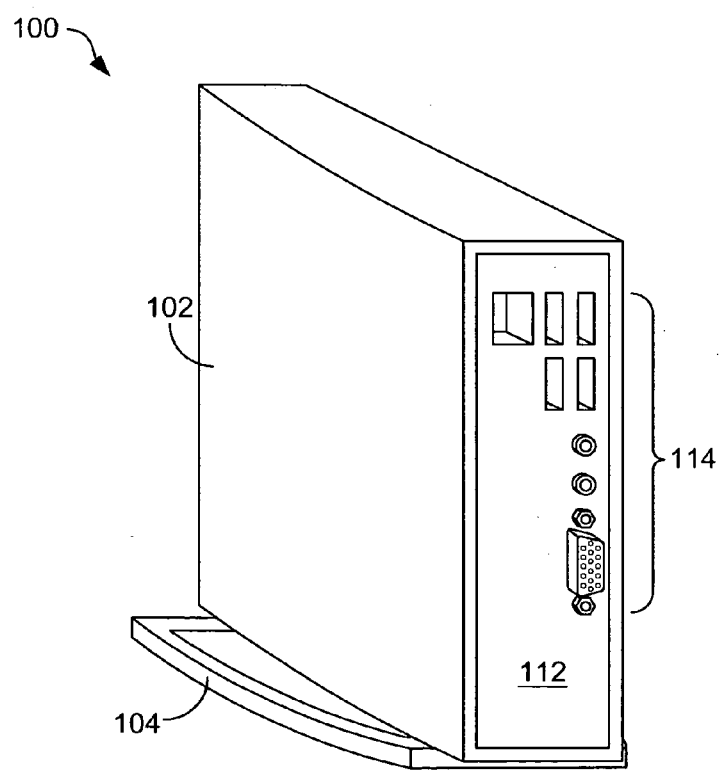
FIG. 2 is a rear perspective view of the computer of FIG. 1.

Turning to FIG. 2, which shows the rear of the computer 100, the computer further comprises a rear connector panel 112, which is accessible from the housing exterior. The connector panel 112 is typically formed of an electrically-conductive material such as a metal (e.g., steel) and comprises a plurality of connectors 114. As is discussed below, the connectors 114 are connected to a motherboard (not visible in FIG. 2) that is, in turn, mounted to the computer inner chassis. The connectors 114 either align with or extend through openings in the connector panel 112 such that the connectors can be accessed from the housing exterior. As is described below, the connectors 114 may be secured to both the motherboard and the connector panel 114 to facilitate integration of the motherboard and the panel into a single module.

By way of example, the various connectors 114 may include a voice or data telephone jack, universal serial bus (USB) jacks, a microphone jack, a headphone jack, and a parallel port jack. Although those particular connectors have been cited as an example, the connectors may include substantially any connector that can mount or connect to a computer motherboard and be accessed via a computer connector panel.

Figure 3:
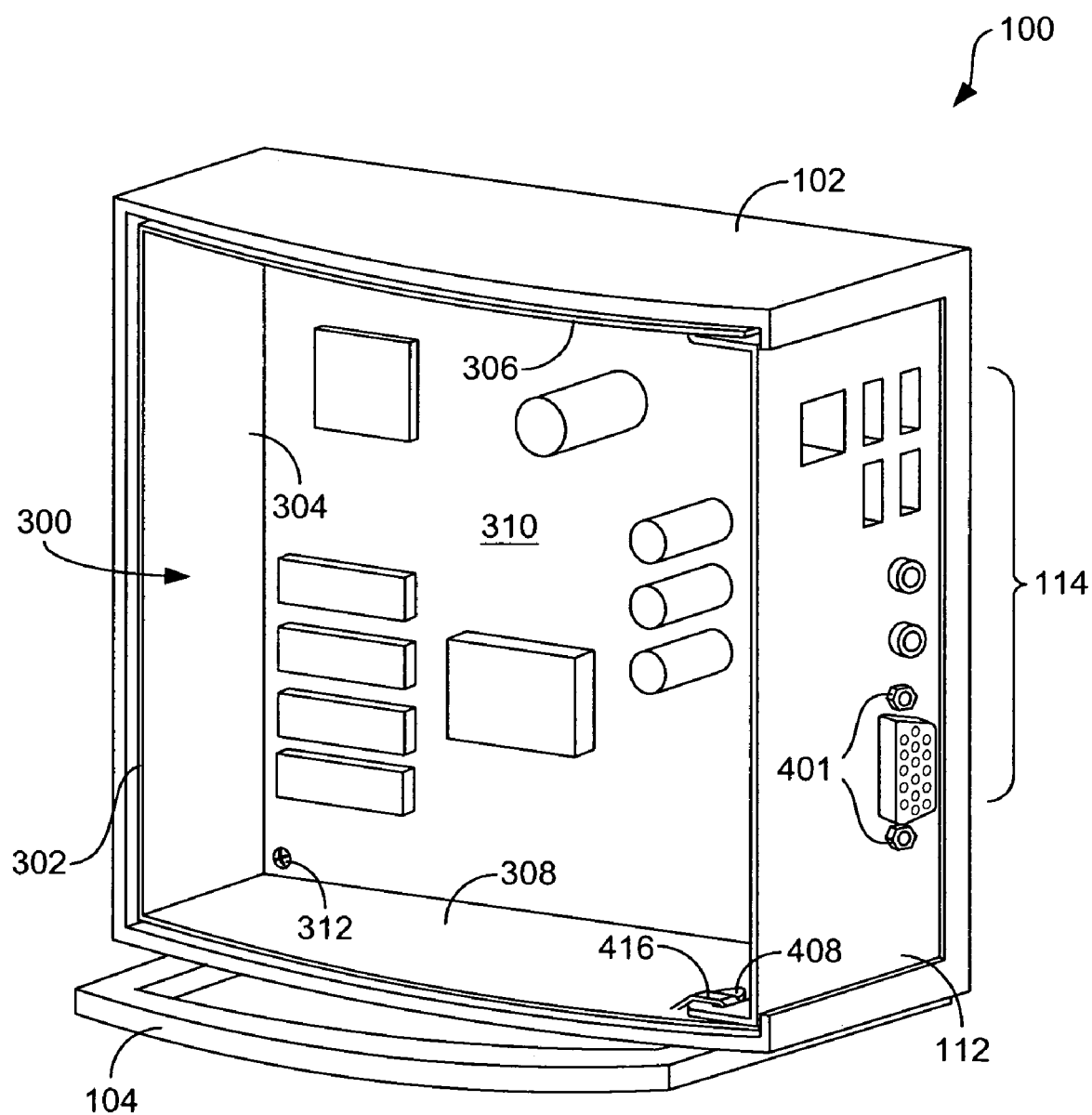
FIG. 3 is a side perspective view of the computer of FIGS. 1 and 2, shown with a portion of an outer housing of the computer removed.

FIG. 3 illustrates the computer 100 with a portion of the outer housing 102 removed. More particularly, FIG. 3 depicts the computer 100 with a side panel of the housing 102 removed (compare with FIG. 1) and an inner chassis cover (not shown) removed. As is evident from FIG. 3, the housing 102 defines an interior space 300 within the computer 100 in which a chassis 302 is provided. By way of example, the chassis 302 comprises a box-like enclosure that is formed from a single piece of sheet metal (which has been folded to form the box). As shown in FIG. 3, the chassis 302 includes side walls, such as a front wall 304, a top wall 306, and a bottom wall 308.

Shown mounted to the chassis 302 is a motherboard 310 or, more generally, a circuit board. The motherboard 310 comprises the primary circuit board (e.g., printed circuit board (PCB)) of the computer 100 and, therefore, includes many of the electrical elements that enable computing (schematically depicted by various elements mounted to the motherboard) including a processor and memory. The motherboard 310 is secured to the chassis 302 with a plurality fasteners. In the example embodiment of FIG. 3, the motherboard 310 is secured using screws 312 (only one screw visible in FIG. 3).

Figure 4:
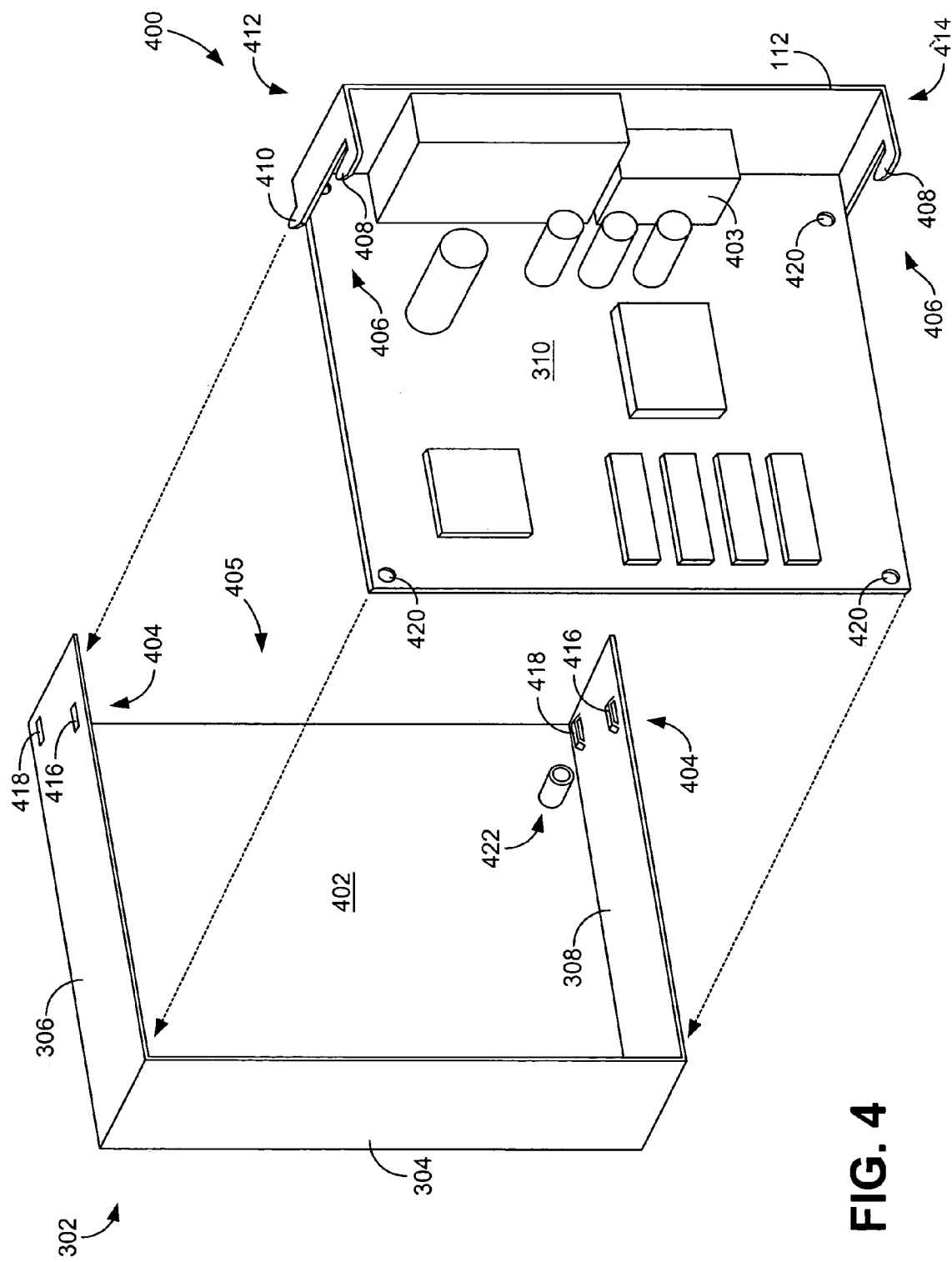
FIG. 4 is a side perspective view of embodiments of a chassis and a motherboard module that may be used in the computer shown in FIGS. 1-3.

The motherboard 310 and the connector panel 112 are connected to each other so as to form a single, integrated motherboard module. Such a module 400 is depicted in FIG. 4. Significantly, the motherboard 310 and the connector panel 112 are connected to each other prior to their integration into the computer 100 so that the motherboard 310 and the connector panel 112 may be installed in the computer together as a unit. As is shown in FIG. 4, the motherboard 310 aligns with the connector panel 112 along of an edge of the motherboard so that the motherboard extends normal (in a mathematics sense of the term) to the connector panel. As noted above, this connection can be facilitated by mounting of the various connectors 114 to both the motherboard 310 and the connector panel 112. For instance, fasteners 401 (see FIG. 3) used to secure a connector 403 to the connector panel 112 can further attach the connector panel to the motherboard 310 in cases in which that connector is already mounted to the motherboard (e.g., with other fasteners or by soldering). To cite a specific example, threaded fasteners used to connect a parallel port connector to the connector panel 112 could be used for this purpose. In such a case, each fastener may include a head that has a threaded opening that is provided to receive a fastener of a plug that is to be secured to the parallel port connector.

Various other methods can be used to connect the motherboard 310 and the connector panel 112. For example, mounting tabs (not shown) can be provided on one of the motherboard 310 and the connector panel 112 and can be secured to the other component using threaded fasteners (e.g., screws) or can be received by slots formed in the other component. Alternatively, the motherboard 310 can be held in place relative to the connector panel 112 using a friction fit mechanism provided on the connector panel (e.g., biased clips). In yet another alternative, the motherboard 310 and connector panel 112 can be spot welded, soldered, or glued together. Generally speaking, substantially any connection mechanism that securely holds the motherboard 310 and the connector panel 112 together and that does not interfere with the functionality of either component can be used to assemble the motherboard module 400 (i.e., integrated motherboard and connector panel).

Also shown in FIG. 4 is the chassis 302 first identified in FIG. 3. In FIG. 4, however, the chassis 302 is shown separate from the remainder of the computer 100 for purposes of clarity. Normally, however, the chassis 302 is installed within the outer housing 102 prior to installation of the motherboard module 400 within the chassis. In addition to the side walls 304, 306, and 308 identified in relation to FIG. 3, the chassis 302 further includes a base 402. Together, the base 402 and side walls 304, 306, and 308 define a box that is open on two sides. With such a configuration, the chassis 302 is open at a back end 405 so as to provide space for the connector panel 112 of the motherboard module 400.

As is apparent from FIG. 4, the motherboard module 400 is configured to be received by the chassis 302. Specifically, the motherboard module 400 is configured to be placed within the chassis 302 such that the motherboard 310 is, at least partially, surrounded by the side walls 304, 306, 308 of the chassis 302 (see also FIG. 3). As is further apparent from FIG. 4, the top and bottom walls 306 and 308 of the chassis 302 include connection elements, such as slot members 404 (most clearly visible on the bottom wall 306), that are configured to receive connection elements, such as tabs 406, provided on the connector panel 112 of the motherboard module 400. The slot members 404, in the illustrated embodiment, extend inwardly within the chassis 302 such that the tabs 406 of the connector panel 112 are received on the inside of the chassis box. It is noted, however, that the slot members 404 could, alternatively, be configured such that the tabs 406 of the connector panel 112 are received on the outside of the chassis box.

In the example embodiment of FIG. 4, there are four connector panel tabs 406, namely first and second tabs 408 and 410 provided on the top and bottom ends 412 and 414 of the connector panel 112. Those tabs are configured for receipt by slot members 416 and 418 provided on the top and bottom side walls 306 and 308 of the chassis 302. With such a configuration, the first tabs 408 can be received by the first slot members 416 and the second tabs 410 can be received by the second slot members 418 when the motherboard module is seated with the chassis 302. An example of such reception (i.e., insertion) is depicted in FIG. 3, which shows a first tab 408 inserted into a first slot member 416. Such insertion of the tabs secures the connector panel to the chassis without the need for separate fasteners.

With reference back to FIG. 4, the motherboard module 400 is inserted into the chassis 302 during manufacture such that the connector panel tabs 406 couple with the chassis slot members 404. In addition to helping secure the motherboard module within the chassis 302, the coupling between the connector panel 112 and the chassis provides an electrical connection between the chassis and the connector panel that facilitates electromagnetic interference (EMI) and electrostatic discharge (ESD) shielding. Specifically, EMI and ESD shielding is achieved because, when the motherboard module 400 is positioned such that its tabs 406 are inserted into the chassis slot members 404, the motherboard 310 is enclosed on all sides by electrically-conductive members (i.e., the chassis 302, the connector panel 112, and the chassis cover (not shown)).

When the motherboard module 400 is correctly positioned within the chassis 302, the motherboard 310 seats within the chassis such that fastener openings 420 formed through the motherboard align with fastener receptacles 420 mounted to or formed in the chassis (only one receptacle visible in FIG. 4). In the example shown in FIG. 4, the fastener receptacles 420 comprise cylindrical posts that include threaded openings. In such a configuration, the motherboard 310 abuts the tops of the cylindrical posts so as to correctly position the motherboard within the chassis 302 when the fasteners are threaded into the fastener receptacles 420. Specifically, the motherboard 310 is fixed in the correct position by passing fasteners (such as screw 312 in FIG. 3) through the openings 420 and threading them into the receptacles 422. When that is accomplished, a result such as that shown in FIG. 3 is achieved.

Figure 5:
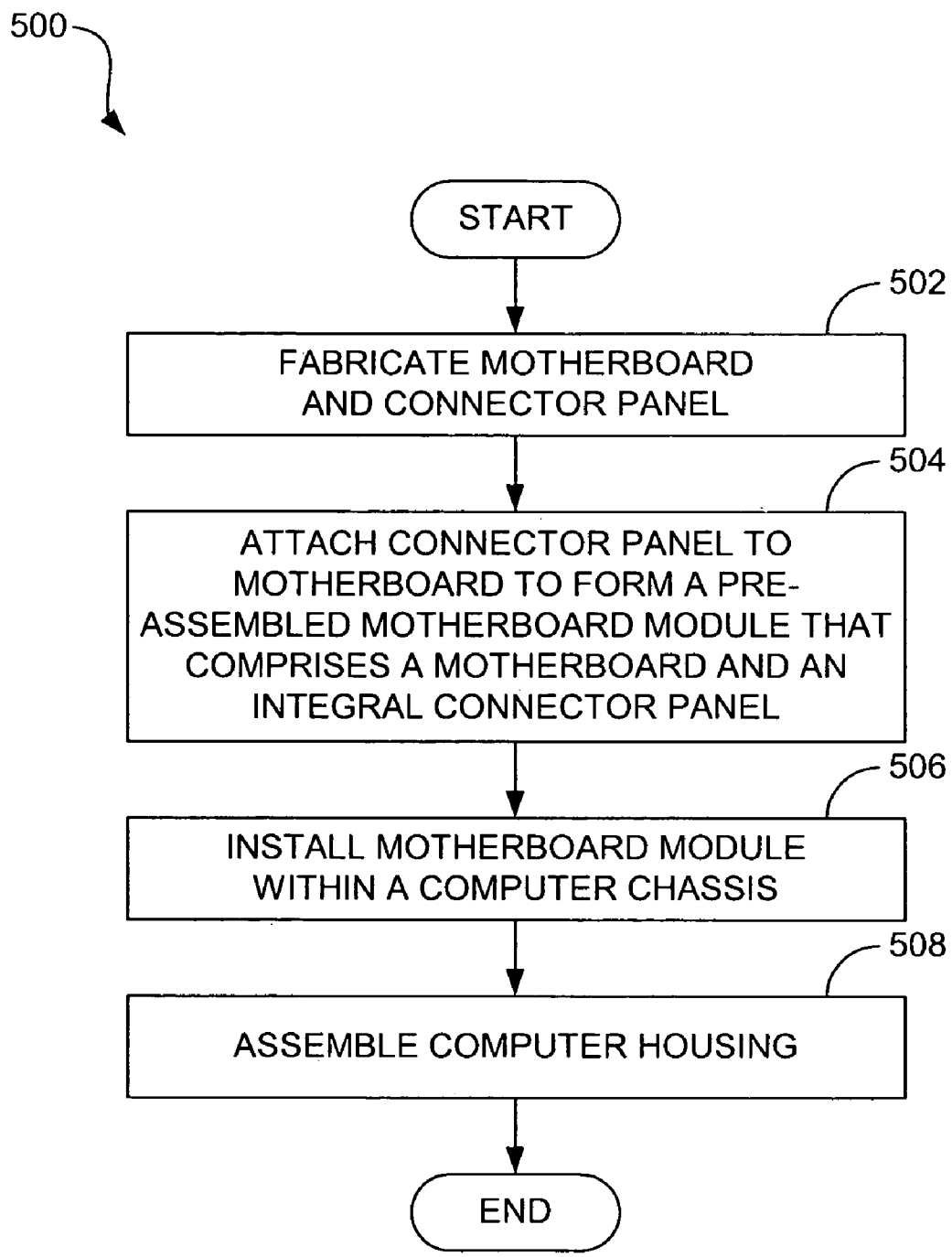
FIG. 5 is a flow diagram that illustrates an embodiment of a method for manufacturing a computer.

FIG. 5 is a flow diagram 500 of a method for manufacturing a computer, such as the computer 100 shown in FIGS. 1-3. It is noted that several manufacturing steps that are beyond the scope of the present disclosure have not been included in FIG. 5. Beginning with block 502, a motherboard and a connector panel are fabricated. As described above, the motherboard may comprise several electrical components, including connectors, each of which may be connected to the motherboard using one of many available connection techniques. Next, the connector panel is attached, or connected, to the motherboard so as to form a pre-assembled motherboard module that comprises a motherboard having an integral connector panel, as indicated in block 504. Such attachment may be achieved in several ways. As noted above, one suitable attachment method is by securing one or more connectors that are mounted to the motherboard to the connector panel using threaded fasteners.

Once the motherboard module has been formed, the module is installed within a computer chassis, as indicated in block 506. By way of example, such installation may comprise inserting one or more tabs of the motherboard module (e.g., provided on the connector panel as in the example of FIGS. 3 and 4) into one or more slot members of the chassis. Notably, the motherboard module can be inserted directly into the chassis (see, e.g., FIG. 4) given that no angling of the motherboard is necessary because of the integration of the motherboard and the connector panel. This aspect of the computer increases both the ease of manufacturing and the ease of disassembly (e.g., for servicing). Moreover, given that additional clearance is not necessary to enable angling of the motherboard, the computer in which the motherboard is used can be smaller (e.g., thinner). Installation may further comprise securing the motherboard in place within the chassis using one or more fasteners (e.g., screws).

Next, as indicated in block 508, the computer housing is assembled so as to enclose the chassis and motherboard within the computer. As described above, the computer housing may be partially assembled prior to installation of the motherboard module within the chassis (see, e.g., FIG. 3). In such a case, assembly of the housing may comprise final assembly of the housing in the form of installing a side panel of the housing that completes the computer housing. Notably, other manufacturing steps may be performed prior to that final assembly. For instance, a chassis cover may be attached to the chassis prior to attachment of the housing panel to completely enclose and shield the motherboard.

Figure 6:
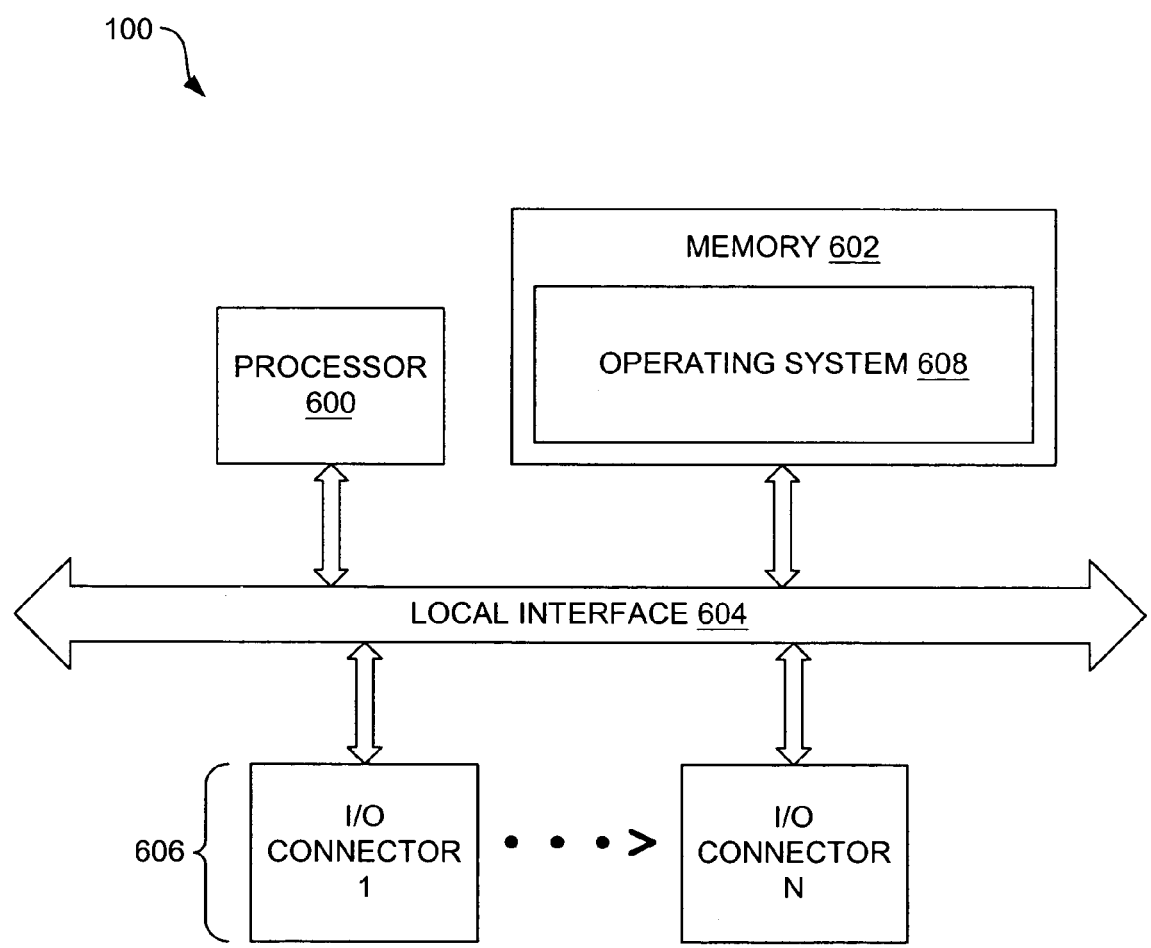
FIG. 6 is a block diagram of an embodiment of an architecture of the computer shown in FIGS. 1-3.

FIG. 6 illustrates an example architecture for the manufactured computer 100 of FIGS. 1-2. As indicated in FIG. 6, the computer 100 comprises a processor 600 and memory 602, each of which is connected to a local interface 604. Notably, each of the processor 600, memory 602, and local interface 604 may comprise part of the computer motherboard. Also connected to the local interface 604 are input/output (I/O) connectors 606. As indicated above, these connectors 606 may be connected to one or both of the motherboard and a computer connector panel.

The computer processor 600 can include a central processing unit (CPU) or an auxiliary processor among several processors associated with the computer 100. The memory 602 includes any one of or a combination of volatile memory elements (e.g., RAM) and nonvolatile memory elements (e.g., read only memory (ROM), Flash memory). In the terminal computer implementation, the memory 602 does not include any mass storage devices. Therefore, the computer embodiment shown in FIGS. 1-2 excludes any mechanical drives, thereby reducing cost.

Stored in memory 602 is an operating system 608. The operating system 608 provides scheduling, input-output control, file and data management, memory management, and communication control and related services and enables the computer 100 to communicate with other computers (e.g., servers). Examples for the connectors 606 have been described above.

Figure 7:
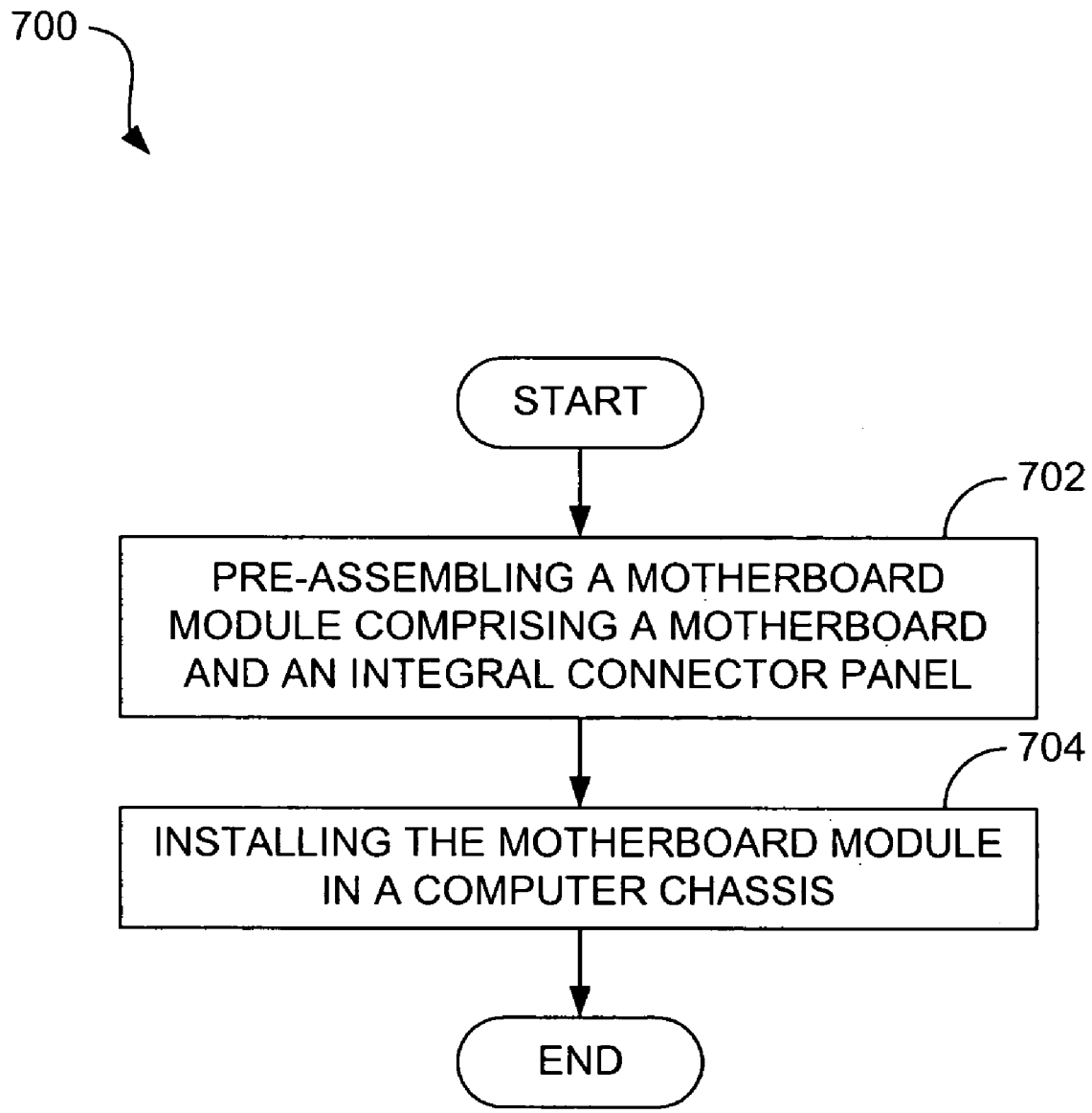
FIG. 7 is a flow diagram that illustrates a further embodiment of a method for manufacturing a computer.

In view of the above, a method 700 for manufacturing a computer can be described as provided in FIG. 7. As indicated in that figure, the method 700 comprises pre-assembling a motherboard module comprising a motherboard and an integral connector panel (block 702) and installing the motherboard module as a single unit in a computer chassis (block 704).

What is claimed is:

1. A circuit board module, comprising:
   a circuit board that includes a processor and memory; and
   an external connector panel that provides user access to connectors that are mounted to the circuit board when the module is installed in a host computer, wherein the connector panel and the circuit board are connected together so as to form a pre-assembled single, integrated unit that is installed as single component in the computer such that the circuit board and the connector panel are not separately installed in the computer, the connector panel comprising inwardly-facing connection tabs that are configured for receipt by slots of a computer chassis to directly connect the connector panel to the computer chassis.

2. The module of claim 1, wherein the circuit board further comprises openings that are adapted to receive fasteners that are used to secure the circuit board to a computer chassis.

3. The module of claim 1, wherein the circuit board is a computer motherboard.

4. The module of claim 1, wherein the connector panel comprises openings with which the connectors are aligned or extend through.

5. The module of claim 1, wherein at least one connector is also attached to the connector panel so as to securely connect the connector panel to the circuit board.

6. A motherboard module separate from a computer, the module comprising:
   a computer motherboard that includes a processor and memory, the motherboard having input/output connectors mounted adjacent a rear edge of the motherboard; and
   an external connector panel having openings that are configured to receive the input/output connectors mounted to the motherboard so as to provide access to the connectors to a computer user when the module is installed in a host computer, the connector panel further comprising inwardly-facing connection tabs that are configured for receipt by slots of a computer chassis to directly connect the panel to the computer chassis;
   wherein the motherboard and the connector panel are connected together so as to form a pre-assembled single, integrated unit in which the rear edge of the motherboard aligns with the connector panel and the motherboard extends normal from the connector panel and wherein the integrated unit is installed within the computer as a single component such that the circuit board and the connector panel are not separately installed in the computer.

7. The module of claim 6, wherein the motherboard further comprises openings that are adapted to receive fasteners that are used to secure the motherboard to a computer chassis.

8. The module of claim 6, wherein at least one connector mounted to the motherboard is also attached to the connector panel to securely connect the connector panel to the motherboard.

9. A computer, comprising:
an outer housing;
a chassis mounted within the outer housing, the chassis including connection slots; and
a pre-assembled motherboard module that includes a motherboard that is mounted within the chassis and an external connector panel that is accessible from the exterior of the computer, the motherboard and the connector panel being connected together to form a single, integrated unit adapted for installation within the computer as a single component such that the circuit board and the connector panel are not separately installed in the computer, the motherboard including a processor, memory, and input/output connectors, the connector panel providing user access to the motherboard connectors and comprising inwardly-facing connection tabs that are configured for receipt by the chassis slots to directly connect the connector panel to the chassis.

10. The computer of claim 9, wherein the connectors are mounted to the motherboard.

11. The computer of claim 9, wherein the circuit board further comprises openings that are adapted to receive fasteners that are used to secure the circuit board to the chassis.

12. The computer of claim 9, wherein at least one connector is attached to the connector panel.

13. The computer of claim 12, wherein the at least one connector is also mounted to the motherboard so as to securely connect the connector panel to the motherboard.

14. A method of manufacturing a computer, the method comprising:

pre-assembling an integrated motherboard module comprising a motherboard and an integral external connector panel; and installing the pre-assembled, integrated motherboard module as a single unit in a computer chassis such that the motherboard and the connector panel are not separately installed in the computer, wherein the installing is performed by mounting the pre-assembled, integrated motherboard module to the computer chassis without sliding the motherboard module into place.

15. The method of claim 14, wherein pre-assembling a motherboard module comprises mounting the connector panel to the motherboard by securing a connector that is mounted to the motherboard to the connector panel.

16. The method of claim 14, wherein installing the motherboard module comprises attaching the connector panel of the motherboard module to the computer chassis using inwardly-facing connection tabs provided on the connector panel that are received by slots provided in the chassis.

17. The method of claim 16, wherein installing the motherboard module further comprises securing the motherboard to the chassis with threaded fasteners.

* * * * *